United States Patent
Surti et al.

(10) Patent No.: US 7,320,053 B2
(45) Date of Patent: Jan. 15, 2008

(54) BANKING RENDER CACHE FOR MULTIPLE ACCESS

(75) Inventors: Prasoonkumar Surti, Folsom, CA (US); Brian Ruttenberg, Sacramento, CA (US); Aditya Navale, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 10/969,877

(22) Filed: Oct. 22, 2004

(65) Prior Publication Data

US 2006/0090046 A1   Apr. 27, 2006

(51) Int. Cl.
*G06F 12/00* (2006.01)

(52) U.S. Cl. ............... 711/118; 711/119; 711/127; 711/129; 711/131; 711/168; 711/147

(58) Field of Classification Search ............... 711/118, 711/119, 127, 129, 131, 168, 147, 149, 150, 711/151
See application file for complete search history.

(56) References Cited

U.S. PATENT DOCUMENTS

2005/0246498 A1* 11/2005 Schupper et al. ........... 711/125

* cited by examiner

*Primary Examiner*—Kimberly McLean-Mayo
(74) *Attorney, Agent, or Firm*—Venable, LLP; James R. Burdett (57) ABSTRACT

A cache memory system may be is organized as a set of numbered banks. If two clients need to access the cache, a contention situation may be resolved by a contention resolution process. The contention resolution process may be based on relative priorities of the clients.

20 Claims, 10 Drawing Sheets

TILED X/TILED X EXAMPLE, WORST CASE COLLISIONS

|  | CLK0 | CLK1 | CLK2 | CLK3 | CLK4 |
|---|---|---|---|---|---|
| Z STREAM | B0,B4 (CL0) | B1,B5 (CL1) NO ACCESS | B1,B5 (CL1) | B2,B6 (CL0) | B3,B7 (CL1) |
| C STREAM | B2,B6 (CL0) | B3,B7 (CL1) NO ACCESS | B3,B7 (CL1) | B0,B4 (CL0) | B1,B5 (CL1) |
| MEMORY |  | B1,B3, B5,B7 | B0,B2, B4,B6 | B1,B3, B5,B7 | B0,B2, B4,B6 |

MEMORY WINS

FIG. 4

TILED Y/TILED Y EXAMPLE, WORST CASE COLLISIONS

| | CLK0 | CLK1 | CLK2 | CLK3 | CLK4 | CLK5 | CLK6 | CLK7 |
|---|---|---|---|---|---|---|---|---|
| Z STREAM | B0,B4 (CL0) | B1,B5 (CL1) NO ACCESS | B1,B5 (CL1) NO ACCESS | B1,B5 (CL1) | B2,B6 (CL0) NO ACCESS | B2,B6 (CL0) | B3,B7 (CL1) NO ACCESS | B3,B7 (CL1) |
| C STREAM | B2,B6 (CL0) | B3,B7 (CL1) NO ACCESS | B3,B7 (CL1) NO ACCESS | B3,B7 (CL1) | B0,B4 (CL0) NO ACCESS | B0,B4 (CL0) | B1,B5 (CL1) NO ACCESS | B1,B5 (CL1) |
| MEMORY | | B1,B3, B5,B7 | B1,B3, B5,B7 | B0,B2, B4,B6 | B0,B2, B4,B6 | B1,B3, B5,B7 | B1,B3, B5,B7 | B0,B2, B4,B6 |

MEMORY WINS (CLK1), MEMORY WINS (CLK2), MEMORY WINS (CLK4), MEMORY WINS (CLK6)

FIG. 5

LINEAR/LINEAR EXAMPLE, WORST CASE COLLISIONS

| | CLK0 | CLK1 | CLK2 | CLK3 | CLK4 | CLK5 | CLK6 | CLK7 | CLK8 |
|---|---|---|---|---|---|---|---|---|---|
| C STREAM | B0 (CL0) | B1 (CL1) NO ACCESS | B1 (CL1) | B0 (CL2) | B1 (CL3) | B2 (CL0) | B3 (CL1) | B2 (CL2) | B3 (CL3) |
| Z STREAM | B4 (CL0) | B5 (CL1) NO ACCESS | B5 (CL1) | B4 (CL2) | B5 (CL3) | B6 (CL0) | B7 (CL1) | B6 (CL2) | B7 (CL3) |
| MEMORY | | B1,B3, B5,B7 ← MEMORY WINS | B0,B2, B4,B6 | B1,B3, B5,B7 | B0,B2, B4,B6 | B1,B3, B5,B7 | B0,B2, B4,B6 | B1,B3, B5,B7 | B0,B2, B4,B6 |

FIG. 6

TILED X (Z)/LINEAR (C) EXAMPLE, WORST CASE COLLISIONS

| | CLK0 | CLK1 | CLK2 | CLK3 | CLK4 | CLK5 | CLK6 | CLK7 | CLK8 | CLK9 | CLK10 | CLK11 | CLK12 | CLK13 | CLK14 | CLK15 | CLK16 |
|---|---|---|---|---|---|---|---|---|---|---|---|---|---|---|---|---|---|
| C STREAM | B0,B6 (CL0) NO ACCESS | B0,B6 (CL0) | | | | B1,B5 (CL1) NO ACCESS | B1,B5 (CL1) | | | | | | | B3,B7 (CL1) NO ACCESS | B3,B7 (CL1) | | |
| Z STREAM | | | B4 (CL0) NO ACCESS | B4 (CL0) | B5 (CL1) | | | B4 (CL2) | B5 (CL3) | B2,B6 (CL0) | B6 (CL0) NO ACCESS | B6 (CL0) | B7 (CL1) | | | B6 (CL2) | B7 (CL3) |
| MEMORY | B0,B2, B4,B6 | B1,B3, B5,B7 | B0,B2, B4,B6 | B1,B3, B5,B7 | B0,B2, B4,B6 | B1,B3, B5,B7 | B0,B2, B4,B6 | B1,B3, B5,B7 | B0,B2, B4,B6 | B1,B3, B5,B7 | B0,B2, B4,B6 | B1,B3, B5,B7 | B0,B2, B4,B6 | B1,B3, B5,B7 | B0,B2, B4,B6 | B1,B3, B5,B7 | B0,B2, B4,B6 |
| | MEMORY WINS | MEMORY WINS | | | | MEMORY WINS | | | | | MEMORY WINS | | | MEMORY WINS | | | |

BANKING RENDER CACHE FOR MULTIPLE ACCESS

BACKGROUND OF THE INVENTION

Embodiments of the invention described herein relate to cache memory access.

Virtually any computing system or digital processing system relies on memory to function. Processing may generally be accelerated by speeding up access to memory. A memory cache may be used to achieve this. In the area of computer graphics, cache memory may be used in support of the rendering process, where fast processing of large amounts of data is required. Cache memory in this or any other application typically allows reads and writes by more than one client. Given frequent repeated access by clients, the cache memory device may be built with multiple read and write ports.

This comes at significant cost, however. Multiple read or write ports represent additional gates. Tens of thousands of additional gates may be necessary to implement additional read and write ports. Additional gates may in turn dictate that the cache memory device be physically larger than it would otherwise be, as well as more expensive. Additional gates may also increase power requirements and create heat dissipation problems.

BRIEF DESCRIPTIONS OF THE FIGURES

The present invention will be described with reference to the accompanying figures. The drawing in which an element first appears is indicated by the leftmost digit(s) in the corresponding reference number.

DETAILED DESCRIPTION OF EMBODIMENTS OF THE INVENTION

Features and advantages of the invention, as well as the structure and operation of various embodiments of the invention are described in detail below with reference to the accompanying figures. It is noted that the invention is not limited to the specific embodiments described herein. Such embodiments are presented herein for illustrative purposes only. Additional embodiments will be apparent to persons skilled in the relevant arts based on the teachings contained herein.

Figure 1:
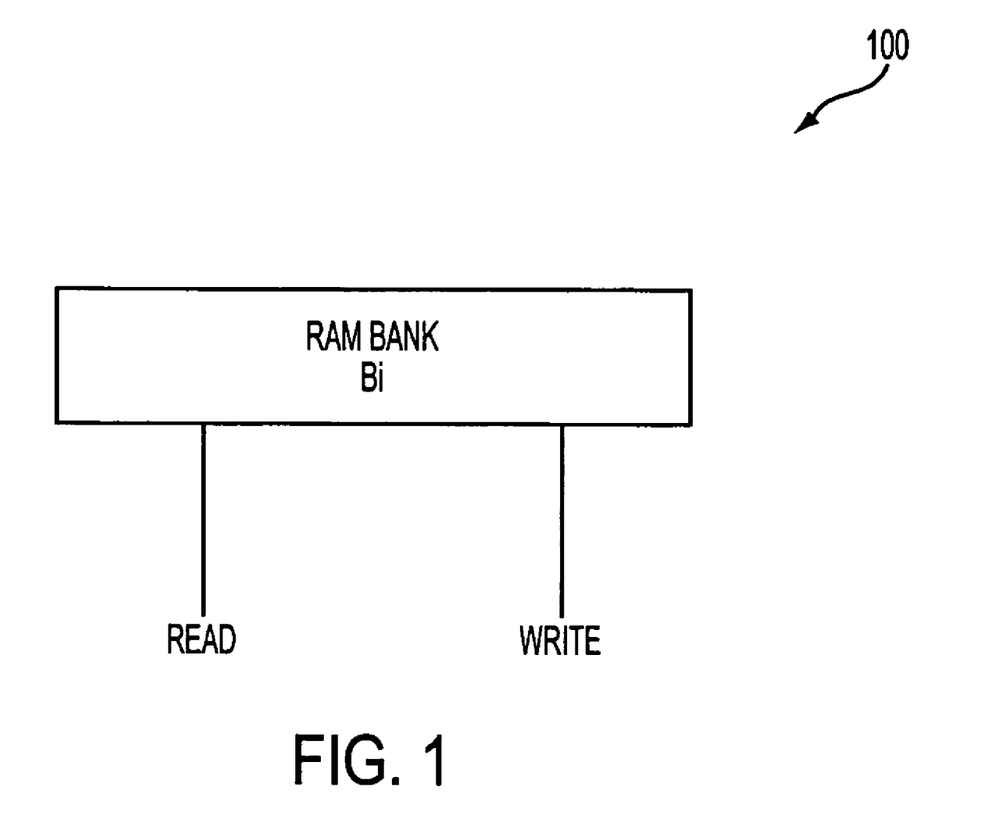
FIG. 1 is a block diagram illustrating a numbered cache and its read and write ports, according to an embodiment of the invention.

In an embodiment of the invention, a memory cache may be implemented as 64 bytes of random access memory (RAM). A single bank may represent 8 bytes of cache. An embodiment of a bank is illustrated generally in FIG. 1. In the illustrated embodiment, the bank is shown with two ports, a read port and a write port. Only one client may use each port in any given clock. In an embodiment of the invention, the memory may be interleaved, dual-channel, double data rate (DDR) memory having a burst length of eight bytes.

Figure 2:
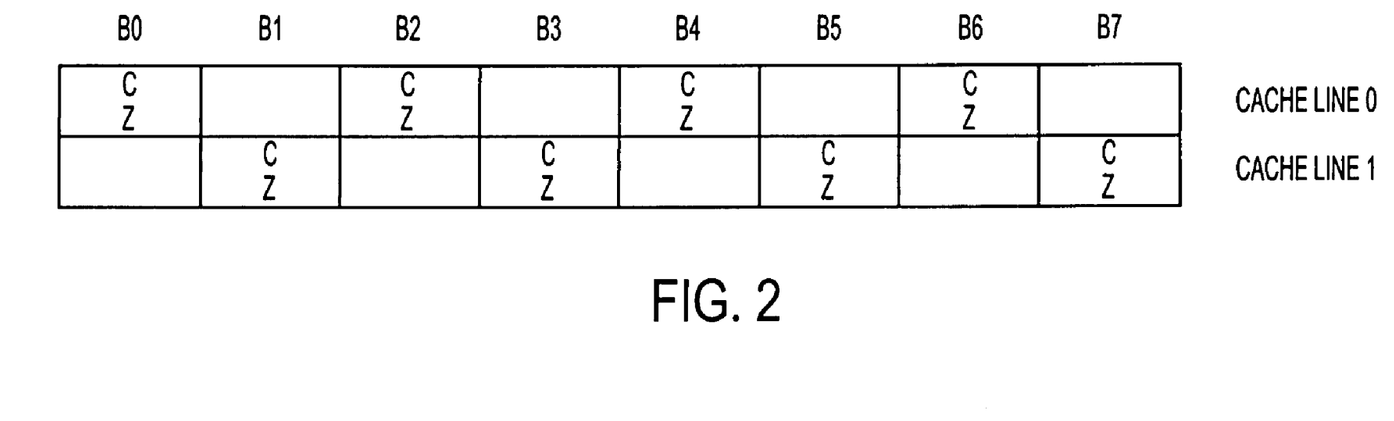
FIG. 2 illustrates the organization of the cache into cache lines and numbered banks, according to an embodiment of the invention.

The cache may be further organized into two cache lines. This is illustrated in FIG. 2. The cache lines are shown as cache lines 0 and 1, while cache banks are shown as banks 0-7. Cache line 0 may correspond to the even numbered banks, while cache line 1 may correspond to the odd numbered banks in the embodiment shown. The illustrated cache may be a computer graphics render cache, wherein the banks may each store color data C, e.g., color coordinate information, and Z data, which relates generally to whether a given pixel obscures another pixel.

Returning to FIG. 2, this figure also illustrates how C and Z data, in a computer graphics rendering context, may be written to the cache in an embodiment of the invention. For example, consider the case of rendering by tiles in the X direction. When rendering a span of four pixels by four pixels, where the span may be divided into four subspans, each of which is two pixels by two pixels, Z data may be written to the cache as follows, in an embodiment of the invention: B0 and B4 may hold the Z data corresponding to the upper left subspan of the four pixel by four pixel span. Banks B1 and B5 may contain the Z data for the lower left subspan. The banks B2 and B6 may contain the Z data for the upper right subspan, while B3 and B7 may contain Z data for the lower right subspan.

With respect to the color data, color information for the upper left subspan may reside in banks B2 and B6. Color data for the lower left subspan may reside in banks B3 and B7. Color data for the upper right subspan may reside in banks B0 and B4. B1 and B5 may contain the color data for lower right subspan.

Figure 3A:
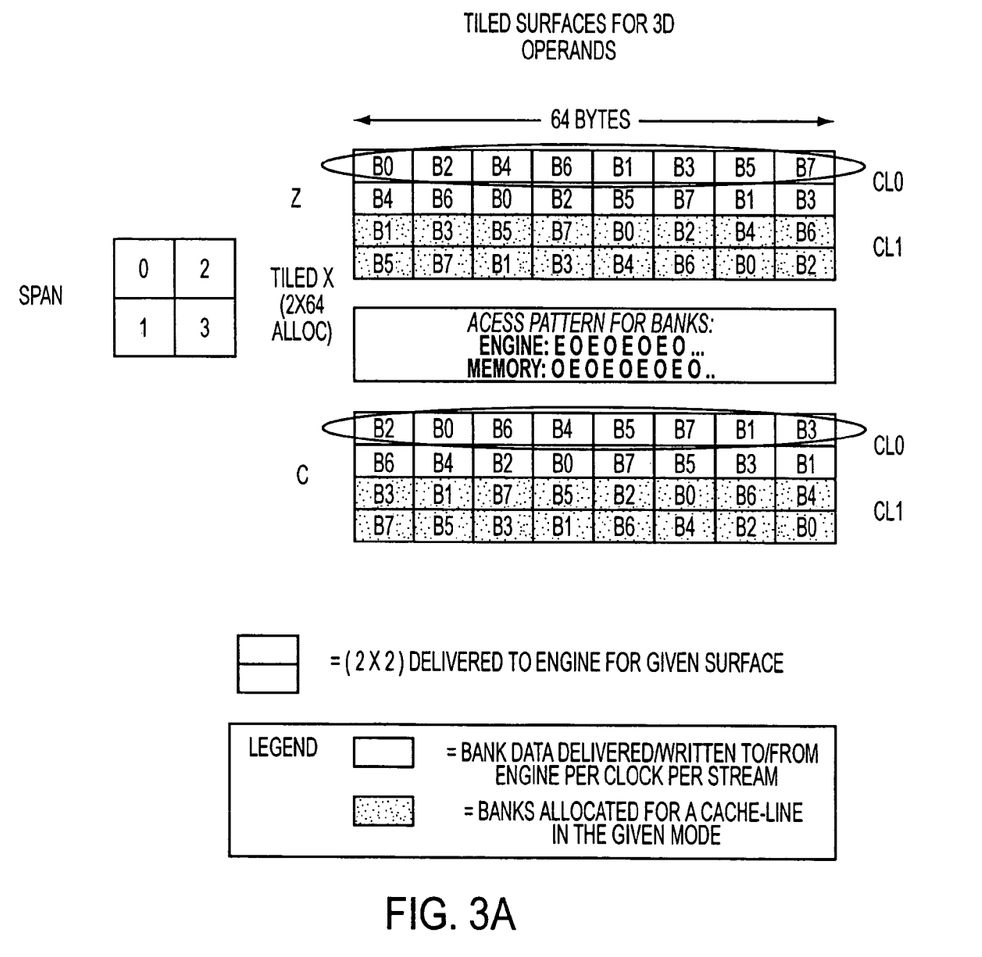
FIGS. 3A and 3B illustrate access patterns for a given client, according to an embodiment of the invention.

This embodiment is further illustrated in FIG. 3A. The span of pixels being rendered is shown as being composed of four subspans, here numbered 0-3. Z data may be stored in the first array of banks. As described above, Z data for subspan 0 may be stored in banks B0 and B4 of cache line 0 (CL0). Z data for subspan 1 may therefore be read from banks B1 and B5 of cache line 1. Z data for subspan 2 may be read from banks B2 and B6 of cache line 0. Z data for subspan 3 may be read from banks B3 and B7 of cache line 1.

Color data for subspan 0 may be read from banks B2 and B6 of cache line 0. Color data for subspan 1 may be read from banks B3 and B7 of cache line 1. Color data for subspan 2 may be read from banks B0 and B4 of cache line 0, while color data for subspan 3 may be read from banks B1 and B5 of cache line 1.

When reading data representing the Z coordinate, even numbered banks may be accessed first, followed by odd numbered banks, followed again by even and then odd numbered banks. The reading of color data may follow the same pattern. The information read in this example may relate to a computer graphics engine. Viewed abstractly, the computer graphics engine may represent a client with respect to the cache. A second client may be memory. As shown in FIG. 3A, memory may be accessed using an opposite pattern. When the computer graphics engine is accessing even numbered banks, memory may be accessing odd numbered banks, and vice versa.

Figure 4:
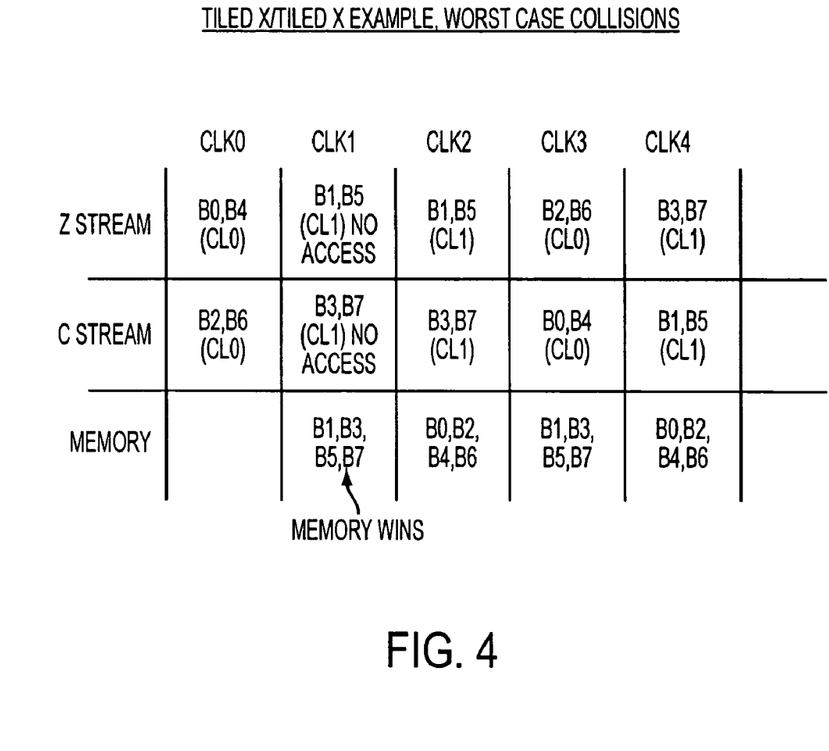
FIG. 4 illustrates access to cache banks by different clients per clock cycle in the context of a render cache, where rendering is performed according to tiles of an image in the X-direction, according to an embodiment of the invention.

This is illustrated in greater detail in FIG. 4. This figure represents a timeline of the banks accessed for the computer graphics rendering engine, i.e., the Z and color data streams, and banks accessed by the memory client. This figure shows a worst case scenario with respect to contention. On the initial clock (CLK0) Z data may be read from banks B0 and B4 of cache line 0, while color data may be read from banks B2 and B6 of cache line 0, as described above. In clock 1 (CLK1), the computer graphics rendering engine client may seek to access banks B1 and B5 for the Z stream and banks B3 and B7 for the color stream. Meanwhile, the memory client may seek to access these same banks.

In the case of such contention, a resolution mechanism may be used. In this example, the resolution is shown as being in favor of the memory client, but the invention is not thusly limited. Therefore, in clock 1, the memory client may access banks B1, B3, B5, and B7. The computer graphics rendering engine client is stalled, however. The banks that it tried to access during clock 1 may be accessed in the next clock cycle, clock 2 (CLK2). Hence, in clock 2, banks B1 and B5 may be read for the Z stream, while banks B3 and B7 may be read for the color stream. At the same time, however, the memory client will have moved on to the even numbered banks, B0, B2, B4, and B6. Therefore in clock 2, there is no contention between the memory client and the computer graphics rendering engine client. In the next clock, clock 3 (CLK3), the computer graphics rendering engine client may seek to access banks B2 and B6 of cache line 0 for the Z stream and to access banks B0 and B4 of cache line 0 for the color stream. Meanwhile, the memory client accesses banks B1, B3, B5, and B7.

This alternating pattern continues in clock 4 (CLK4). Here, the computer graphics rendering engine may access the odd numbered banks, while the memory client may access the even numbered banks. The computer graphics rendering engine client may access blocks B3 and B7 of cache line 1 for the Z stream, while accessing blocks B1 and B5 of cache line 1 for the color stream. Meanwhile, the memory client may access even numbered blocks B0, B2, B4, and B6. Therefore, starting with clock 2, the computer graphics rendering engine client may access the odd numbered banks, while the memory client may access the even numbered banks. In the next clock cycle, the computer graphics rendering engine client may access the even numbered banks, while the memory client may access the odd numbered banks.

In this way, two clients (here, a computer graphics rendering engine client and a memory client) may have the necessary access to cache memory indefinitely, while having to deal with contention in only one clock cycle.

Figure 3B:
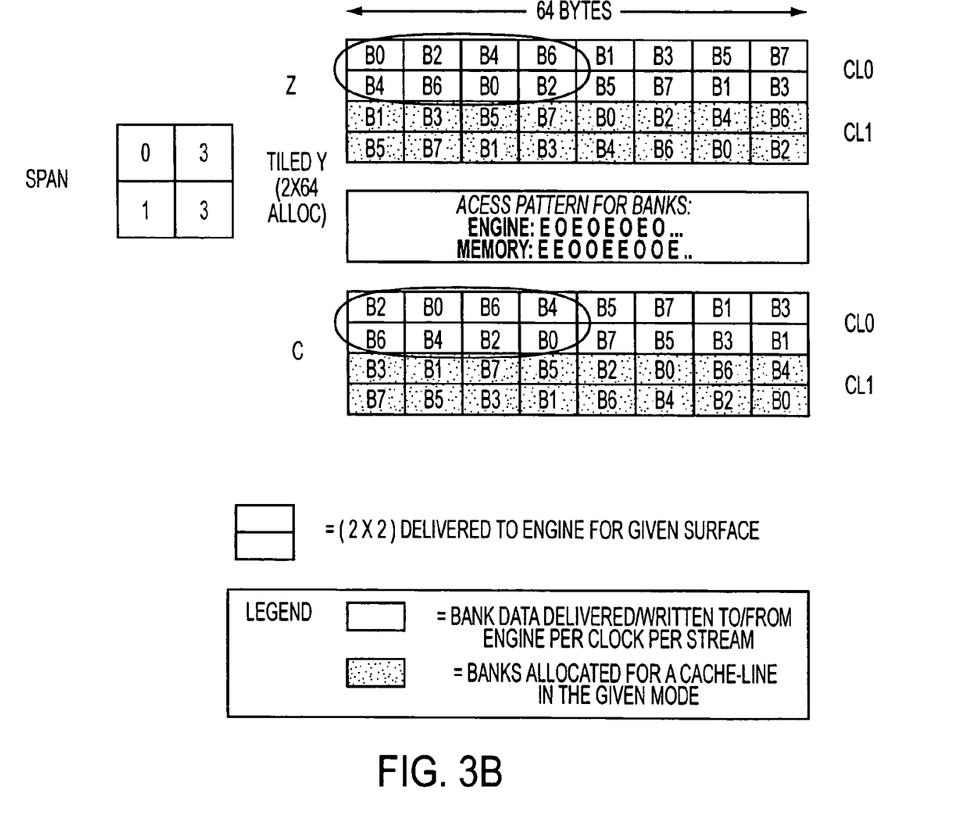

In FIG. 3B, the case of rendering by tiles in the Y-direction is illustrated, according to an embodiment of the invention. Z data for the upper left subspan may be stored in banks B0 and B4 in cache line 0. Z data for the lower left subspan may be stored in banks B1 and B5 of cache line 1. Z data for the upper right subspan may be stored in banks B2 and B6 of cache line 0, while the Z data for the lower right subspan may be stored in banks B3 and B7 of cache line 1.

Looking now to the color information, color data for the upper left subspan may be stored in banks B2 and B6 of cache line 0, while the color data for the lower left subspan may be stored in banks B3 and B7 of cache line 1. Color data for the upper right subspan may be stored in banks B0 and B4 of cache line 0, while the color data for the lower right subspan may be stored in banks B1 and B5 of cache line 1.

Figure 5:
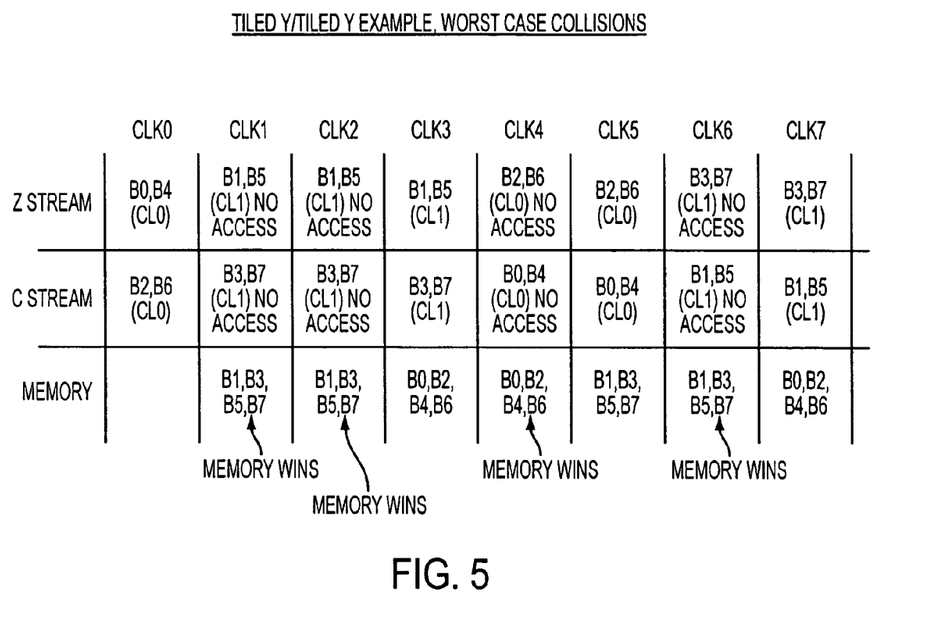
FIG. 5 illustrates access to cache banks by different clients, per clock cycle, in the context of a computer graphics render cache where rendering is performed by tiling in the Y-direction, according to an embodiment of the invention.

Access to the cache in the case of rendering by tiles in the Y-direction, according to an embodiment of the invention, is illustrated in FIG. 5. This figure represents a worst-case scenario with respect to contention. In the initial clock cycle, Z data may be read by the computer graphics rendering engine client from banks B0 and B4, while color data may be read from banks B2 and B6, all from cache line 0. In clock 1, the computer graphics rendering engine may attempt to read Z data from banks B1 and B5 of cache line 1 while the engine may also attempt to read color data from banks B3 and B7 of cache line 1. At the same time, however, the memory client may seek to access banks B1, B3, B5, and B7. In an embodiment of the invention, memory access is given priority over rendering engine access. Therefore, in clock 1, the memory client may be able to access banks B1, B3, B5 and B7, while the computer graphics rendering engine may be denied access to those banks. Because tiling is progressing in the Y-direction, the memory client needs those same banks in clock 2. Meanwhile, the computer graphics rendering engine, having been stalled in clock 1, may attempt to access banks B1, B3, B5, and B7 in clock 2. Because the memory client has priority in this embodiment, however, the memory client will prevail, and access by the computer graphics rendering engine is again stalled in clock 2.

In clock 3, the memory client may now seek access to banks B0, B2, B4, and B6. The computer graphics rendering engine may seek Z data from banks B1 and B5 of cache line 1, while color data may be sought from banks B3 and B7 of cache line 1. Because there is now no contention between the computer graphics rendering engine and the memory client, both clients may have access to the respective banks that they need.

In clock 4, however, the computer graphics rendering engine may seek to access banks B2 and B6 of cache line 0 for the Z data, while trying to access banks B0 and B4 of cache line 0 for the color data. Again, the memory client may seek to access these same banks in clock 4. Because the memory client has priority in this embodiment, the memory client prevails and may have access to those banks in the illustrated embodiment. The computer graphics rendering engine client, meanwhile, may be stalled, and may attempt to access those banks in the next clock, clock 5. At this point, however, the memory client may seek access to blocks B1, B3, B5, and B7. Because the memory client and the computer graphics rendering client are not in contention, the clients may access the respective banks that they need. In clock 6, the computer graphics rendering engine client may seek to access banks B3 and B7 of cache line 1 for the Z data stored therein, while attempting to access banks B1 and B5 of cache line 1 for the color data. At the same time, however, the memory client may seek to access these same banks. Again, in this embodiment, the memory client prevails, so that the computer graphics rendering engine client may only access banks B3, B7, B1 and B5 in the next clock, clock 7. In clock 7, the memory client may have access to banks B0, B2, B4, and B6, so that memory client is not in contention with the computer graphics rendering engine client in this clock.

Figure 6:
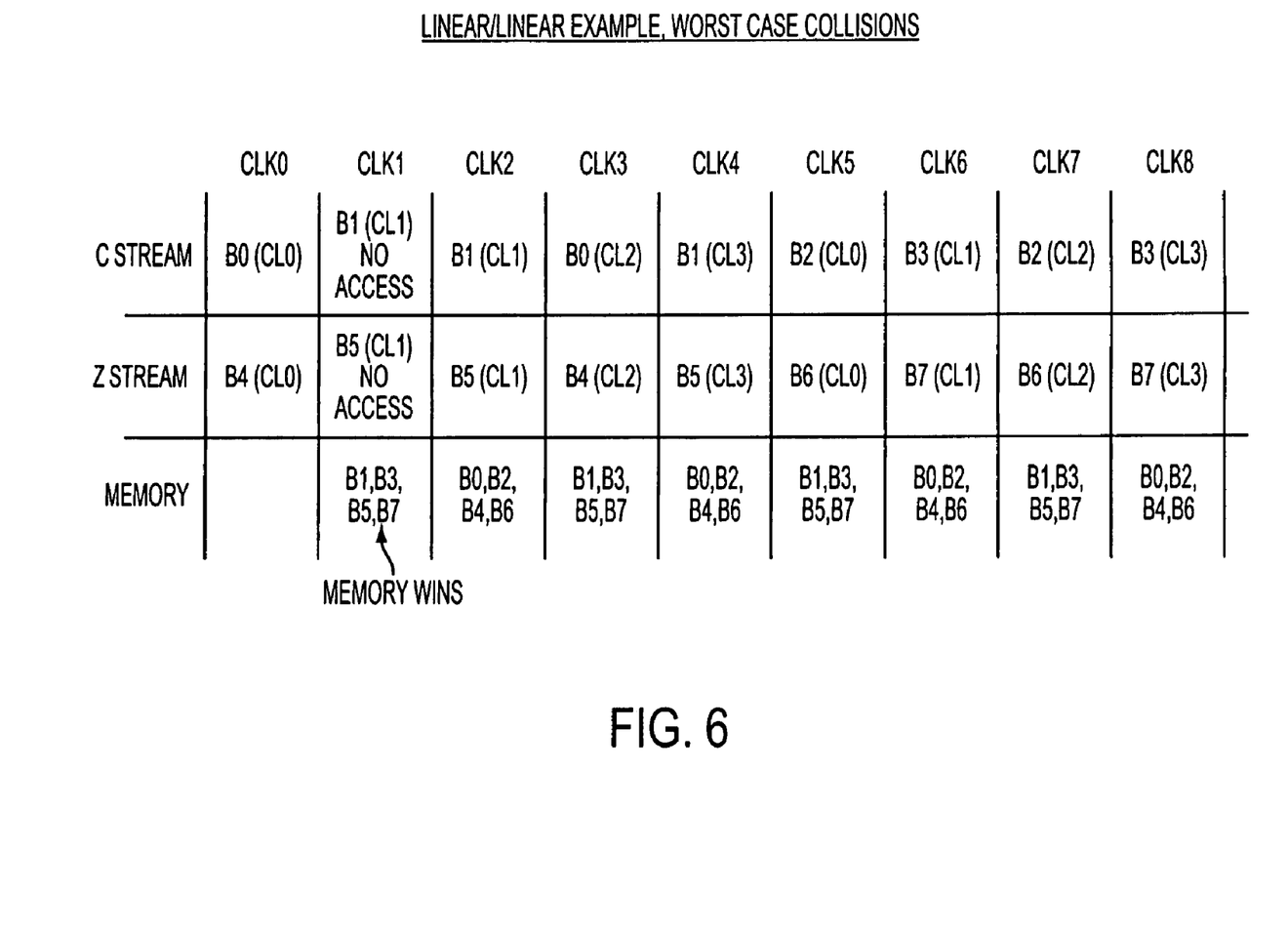
FIG. 6 illustrates access to cache banks by different clients, per clock cycle, in the context of a computer graphics render cache where rendering is performed without tiling, according to an embodiment of the invention.

In the case where tiling is not employed and rendering and memory access proceed in a linear manner, four cache lines (CL0 through CL3) may be used. This is illustrated in FIG.

6. This figure shows a worst case scenario with respect to contention. In CLK0, the computer graphics rendering engine client may access banks B0 and B4 in CL0 for color data and Z data respectively. In CLK1, the rendering engine client may attempt to access banks B1 and B5 in CL1. The memory client, however, may seek to access odd-numbered banks B1, B3, B5, and B7 during the same clock. In the illustrated embodiment, the memory client is given a higher priority than the rendering engine client, so that the contention over B1 and B5 is resolved in favor of the memory client. In the next clock, CLK2, the memory may now access the even banks B0, B2, B4, and B6, while the rendering engine client may access B1 and B5.

From CLK 2 forward, the rendering engine client may access either even or odd banks, while the memory client may access either odd or even banks, respectively, so that contention is generally avoided. In CLK3, the rendering engine client may access even-numbered banks B0 and B4 in CL2. The memory client may now access the odd-numbered banks, B1, B3, B5, and B7, without contention. In CLK4, the rendering engine client may access banks B1 and B5 in CL3, while the memory client may access the even-numbered banks. In CLK5, the rendering engine client may return to CL0 to access banks B2 and B6. At this point, the memory client may access the odd-numbered banks B1, B3, B5 and B7. In CLK6, the rendering engine client may access odd-numbered banks B3 and B7 in CL1, while the memory client may access the even-numbered banks B0, B2, B4, and B6. In CLK7, the rendering engine client may access even-numbered banks B2 and B6 in CL2, while the memory client may access the odd-numbered banks. In CLK8, the rendering engine client may access odd-numbered banks B3 and B7 in CL3, while the memory client may access the even-numbered banks.

Figure 7:
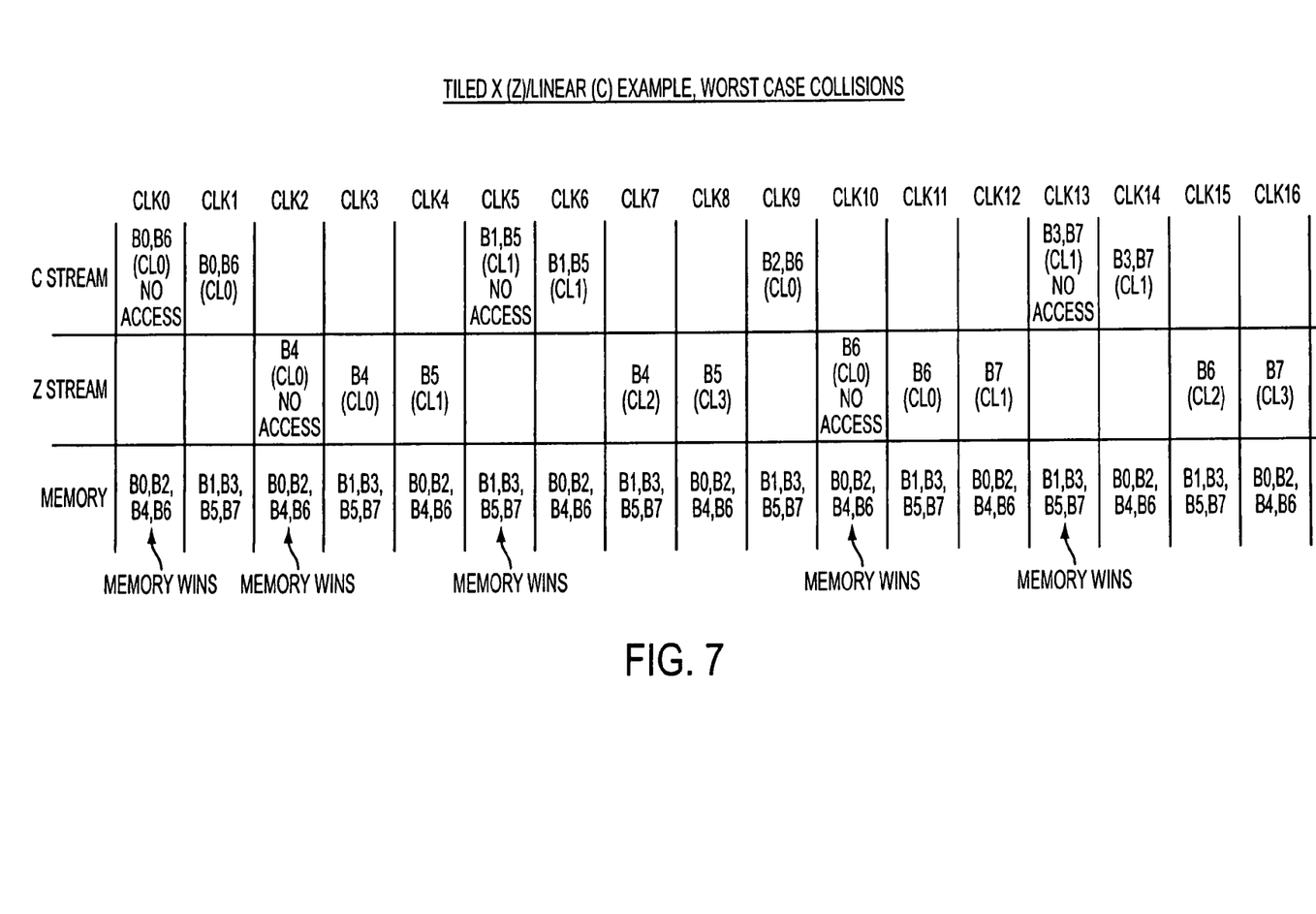
FIG. 7 illustrates access to cache banks by different clients, per clock cycle, in the context of a computer graphics render cache where Z data is handled on a tiled basis and color data is handled linearly, according to an embodiment of the invention.

In another embodiment of the invention, tiling may be used for Z data, while color data may be processed in a linear manner. The worst case with respect to collisions is illustrated in FIG. 7. At CLK0, color data may be sought from banks B0 and B6 in CL0. If the memory client seeks access to the even-numbered banks B0, B2, B4, and B6, contention arises. In the illustrated embodiment, the memory client may be given priority, so that the access to B0 and B6 may be denied to the rendering engine client. Access to those banks by the rendering engine client may be deferred until CLK1, at which point the memory client may have moved on to the odd-numbered banks B1, B3, B5, and B7. In CLK2, the rendering engine client may seek to access Z data in bank B4 of CL0. The memory client may seek access to the even-numbered banks at this point, however, creating a contention situation. If the contention is resolved in favor of the memory client, the rendering engine client may be denied access to bank B4 until the next clock, CLK3. At this point, the memory client may seek access to the odd-numbered banks, so that there is no contention. At CLK4, the rendering engine client may seek to access bank B5 of CL1. At this point, the memory client may seek access to the even-numbered banks, so that there is no contention.

The process continues as shown in FIG. 7. The rendering engine client may seek to access color data and Z data alternately. In the general pattern of the rendering engine client, starting at CLK0, this client may seek access to color data in banks B0 and B6 of CL0; the rendering engine client may then seek to access Z data from B4 of CL0, then from B5 of CL1. This client may then seek color data from banks B1 and B5 (CL1); it then seeks Z data from bank B4 (CL2), then from B5 (CL3). This client may next seek access to color data in banks B2 and B6 of CL0; the rendering engine client may then seek to access Z data from B6 of CL0, then from B7 of CL1. This client may then seek color data from banks B3 and B7 (CL1); it then seeks Z data from bank B6 (CL2) then from B7 (CL3). The memory client, meanwhile, may seek access to the even numbered banks, then the odd-numbered banks. If the memory client is ever in contention with the rendering engine client, then the memory client may prevail in the illustrated embodiment. The access sought by the rendering engine client is then deferred until the following clock cycle.

Figure 8:
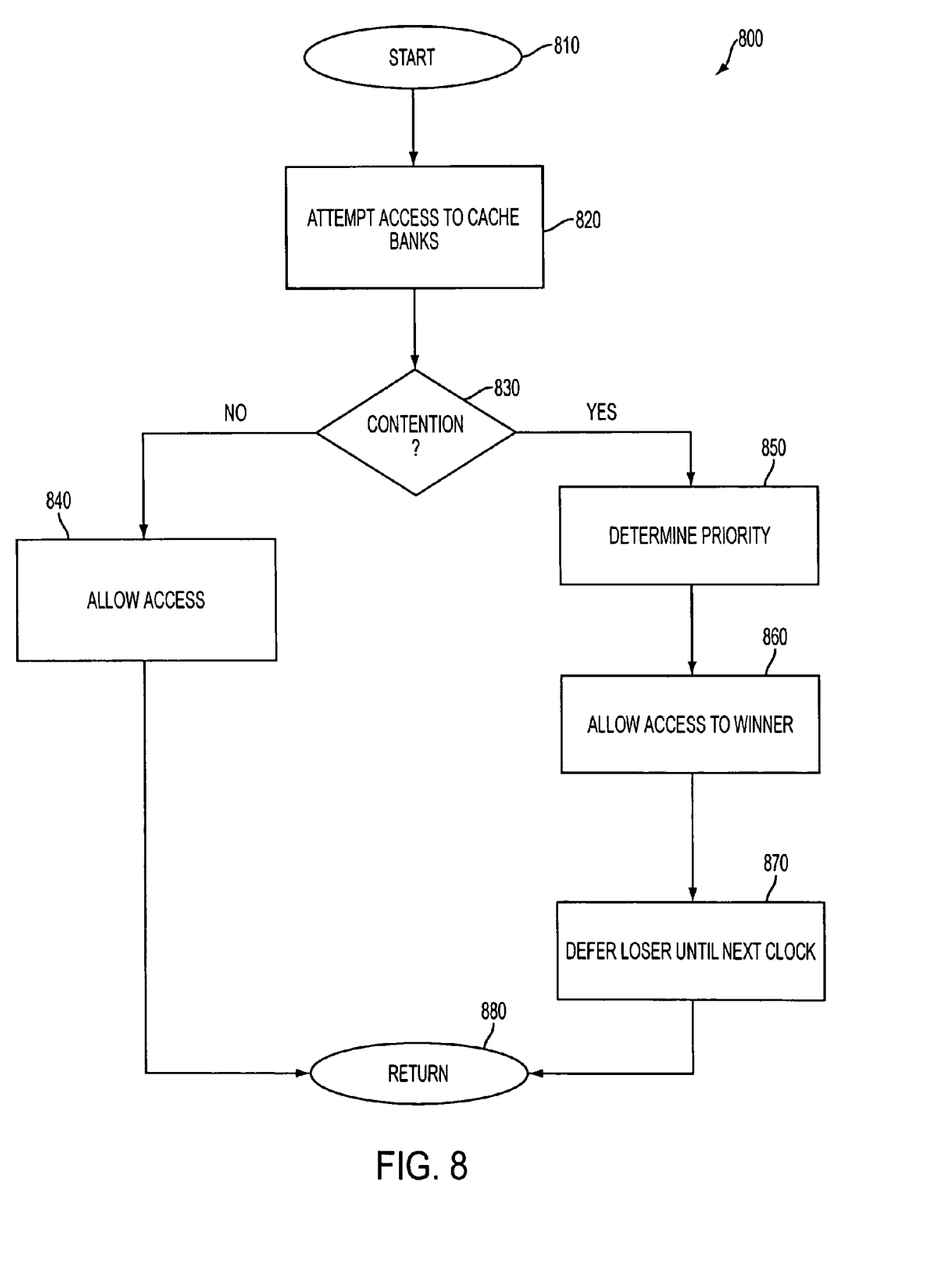
FIG. 8 is a flow chart illustrating the contention resolution process according to an embodiment of the invention.

An embodiment of the process for resolving contention among one or more clients for a bank of memory is illustrated in FIG. 8. The process begins at block 810. In block 820, a client may attempt to access one or more cache banks. In block 830, a determination may be made as to whether or not there is contention between the requesting client and any other client attempting to access the same bank. If there is no contention, then access may be allowed in block 840. If contention is found in block 830, then the process may continue at block 850. Here, a determination may be made as to which client will be allowed access to the bank. In block 860, the winner of this determination (the prevailing client) may be allowed access to the bank; in block 870, the client that failed to gain access to the bank (the non-prevailing client) may be deferred until the next clock cycle. The process may conclude at block 870.

The above arbitration process applies to both accessing the read port and accessing the write port. In either case, when a collision occurs, the lower priority client will stall until the banks that are needed by this client become available. Note that in zone rendering, there will be no memory writes and no initialization from the write-only queue. As a result, collisions are infrequent.

In an embodiment of the invention, arbitration for the read port may be based on the following prioritization:
Overlay read (highest priority)
Memory read
Intermediate Z read
Color calculator read (lowest priority)

In an embodiment of the invention, arbitration for the write port may be based on the following prioritization:
Memory write, data returning from memory, including overlay data (highest priority)
Write only queue
Intermediate Z write
Color calculator write (lowest priority)

The process described above may operate in conjunction with a computer graphics renderer. Logic that implements this processing may take the form of software which executes in a computing environment illustrated in FIG. 9.

Figure 9:
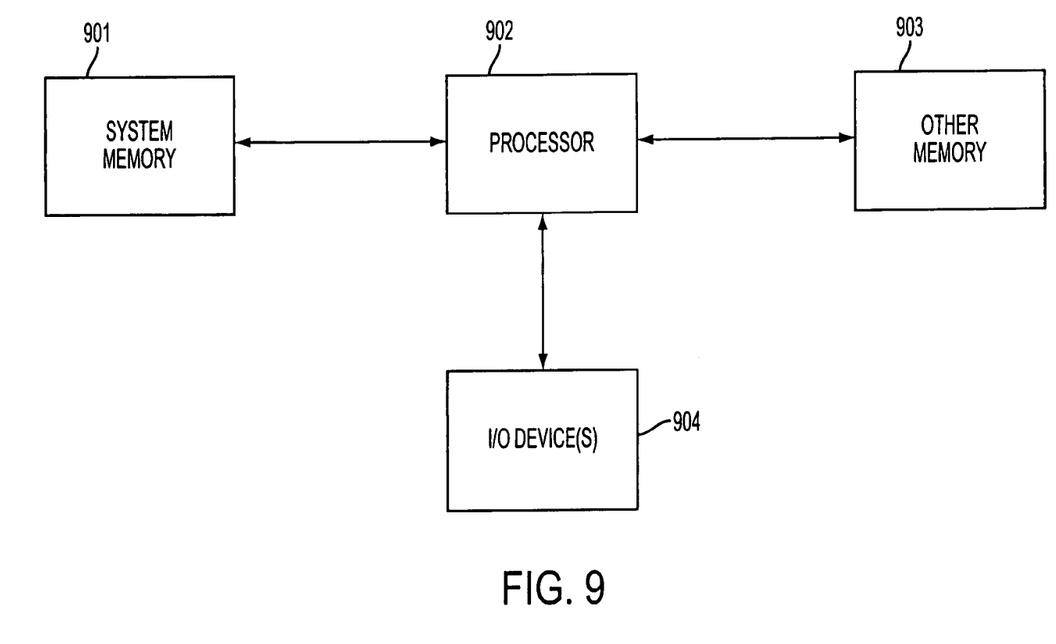
FIG. 9 is a block diagram illustrating the computing context of an embodiment of the invention.

The computing system of FIG. 9 may include at least one processor 902, with associated system memory 901, which may store, for example, operating system software and the like. The system may further include additional memory 903, which may, for example, include software instructions to perform various applications. The system may also include one or more input/output (I/O) devices 904, for example (but not limited to), keyboard, mouse, trackball, printer, display, network connection, etc. The present invention may be embodied as software instructions that may be stored in system memory 901 or in additional memory 903. Such software instructions may also be stored in removable or remote media (for example, but not limited to, compact disks, floppy disks, etc.), which may be read through an I/O device 904 (for example, but not limited to, a floppy disk drive). Furthermore, the software instructions may also be transmitted to the computer system via an I/O device 904 for example, a network connection; in such a case, a signal containing the software instructions may be considered to be a machine-readable medium.

In another embodiment, the invention may be implemented primarily in hardware using, for example, hardware components such as application specific integrated circuits (ASICs). Implementation of a hardware state machine so as to perform the functions described herein will be apparent to persons skilled in the relevant art(s). As discussed above, the invention may be implemented using any combination of hardware, firmware and software.

While various embodiments of the present invention have been described above, it should be understood that they have been presented by way of example, and not limitation. It will be apparent to persons skilled in the relevant art that various changes in form and detail may be made therein without departing from the spirit and the scope of the invention.

The present invention has been described above with the aid of functional building blocks and method blocks illustrating the performance of specified functions and relationships thereof. Boundaries of these functional building blocks and method blocks have been arbitrarily defined herein for the convenience of the description. Alternate boundaries may be defined so long as the specified functions and relationships thereof are appropriately performed. Any such alternate boundaries are thus within the scope and spirit of the claimed invention. One skilled in the art will recognize that these functional building blocks may be implemented by discrete components, applications specific integrated circuits, processors executing appropriate software and the like or any combination thereof. Thus, the breadth and scope of the present invention should not be limited by any of the above-described exemplary embodiments, which should be defined only in accordance with the following claims and to their equivalents.

What is claimed is:

1. A memory cache system comprising:
   a set of numbered cache banks, organized into complementary even and odd subsets, each cache bank comprising at least one read port and at least one write port, to permit a first client to access even and odd banks on alternate clock intervals and a second client to access odd and even banks on alternate clock intervals, respectively; and
   arbitration logic to allow access to a cache bank by one of said clients having a priority over the other of said clients having a lower priority when contention between said higher and lower priority clients exists during a clock cycle and defer access by said lower priority client to a subsequent clock interval, wherein contention comprises said higher and lower priority clients accessing the same port of the same bank, and to allow access by both of said clients when there is no contention.

2. The system of claim 1, wherein said cache banks are implemented in random access memory (RAM).

3. The system of claim 1 wherein said set of numbered cache banks comprises eight cache banks.

4. The system of claim 1, wherein said clients comprise a memory client and a color calculator client.

5. The system of claim 1 wherein said subsequent clock interval is an immediately following clock interval.

6. The system of claim 1, wherein said cache banks form at least a portion of a computer graphics render cache.

7. The system of claim 1, wherein each of said alternate clock intervals comprises one clock cycle.

8. The system of claim 1, wherein each of said alternate clock intervals of said first client comprises one clock cycle, and each of said alternate clock intervals of said second client comprises two clock cycles.

9. A method, comprising:
   attempting access to a read port or a write port of a first cache bank by a first client during a clock interval where the first cache bank is in a first set of cache banks;
   determining whether the first client and a second client are in contention for the first cache bank during the clock interval wherein contention occurs when the first client and the second client attempt to access the same port of the first cache bank;
   if there is no contention,
      allowing access by the first client to the first cache bank; and
      during a subsequent clock interval, attempting access to a read port or a write port of a second cache bank by the first client, where the second cache bank is in a second set of cache banks that is disjoint from the first set of cache banks; and
   if there is contention, wherein contention occurs when the first client and the second client attempt to access the same port of the second cache bank
      determining a relative priority of the first and second clients;
      allowing access by a higher priority one of the first and second clients; and
      deferring access by a lower priority one of the first and second clients to a subsequent clock interval,
   wherein the first client accesses the first and second sets of cache banks alternately, and the second client accesses the second and first sets of cache banks alternately.

10. The method of claim 9, wherein the subsequent clock interval is the next clock cycle.

11. The method of claim 9, wherein the cache bank is implemented as random access memory (RAM).

12. The method of claim 9, wherein the higher priority client is a memory client.

13. The method of claim 9, wherein the lower priority client is a color calculation client.

14. The method of claim 9, wherein the first and second cache banks are portions of a computer graphics rendering cache.

15. A computer memory that is:
   dual-channeled;
   interleaved; and
   organized into at least first and second disjoint sets of cache banks, each cache bank comprising at least one read port and at least one write port, such that a first client can access a first port of said first and second set of cache banks alternately and a second client can access said first port of said first set of cache banks when not accessed by said first client can access said first port of said second set of cache banks when not accessed by said first client, and can access a second port of said first or second set of cache banks at the same time said first client accesses said first port of said first or second set of caches banks.

16. The memory of claim 15, wherein said first client is a memory client.

17. The memory of claim 15, wherein said second client is a computer graphics rendering engine client.

18. The memory of claim 15, wherein said first and second sets of cache banks each comprise eight cache banks.

19. The memory of claim 15, wherein the memory has a burst length of eight bytes.

20. The memory of claim 15, wherein each cache bank comprises one read port and one write port.

* * * * *